United States Patent

[11] 3,571,607

| [72] | Inventors | Joseph A. Giordmaine;<br>Stanley L. Shapiro, Summitt, N.Y. |
|---|---|---|
| [21] | Appl. No. | 773,446 |
| [22] | Filed | Nov. 5, 1968 |
| [45] | Patented | Mar. 23, 1971 |
| [73] | Assignee | Bell Telephone Laboratories Incorporated<br>Murray Hill, Berkley Heights, N.J. |

[54] HIGHLY EFFICIENT RAMAN EMISSION DEVICE
6 Claims, 1 Drawing Fig.

[52] U.S. Cl............................................. 307/88.3,
321/69, 330/4.5, 330/5
[51] Int. Cl............................................. H03f 7/00
[50] Field of Search............................................. 307/88.3;
321/69

Primary Examiner—Roy Lake
Assistant Examiner—Darwin R. Hostetter
Attorneys—R. J. Guenther and Arthur J. Torsiglieri ABSTRACT: The invention includes an elongated Raman active medium having total internal reflection means along its longitudinal dimension. Optical pumping is by pulses of duration of the order of several picoseconds or less made incident upon one end of the medium and direction along the longitudinal axis thereof. The Raman emission inherently traverses a zigzag path within the medium at an angle such that the group velocity of the Raman and pump pulses is matched, i.e., differences in group velocity of the pump and Raman radiation due to the dispersion of the medium are compensated for.

PATENTED MAR 23 1971　　　　　　　　　　　　　　　3,571,607
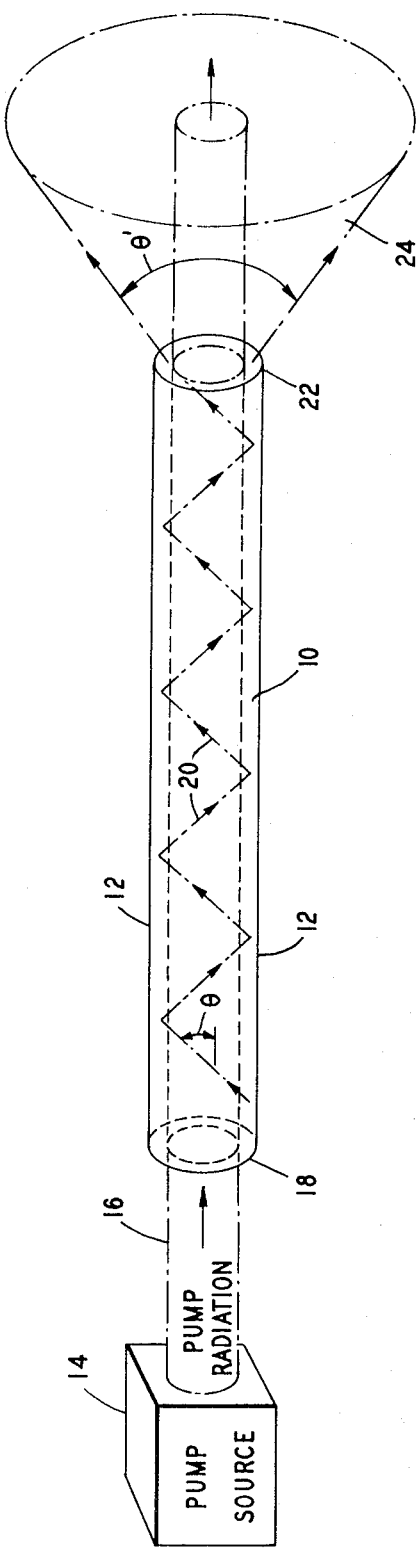
INVENTORS: J. A. GIORDMAINE
S. L. SHAPIRO
BY David P. Kelly
ATTORNEY

3,571,607

HIGHLY EFFICIENT RAMAN EMISSION DEVICE

BACKGROUND OF THE INVENTION

This invention relates to Raman emission devices and more particularly to such devices including means for group velocity matching the Raman radiation to picosecond pump pulse radiation.

Recently, second harmonic generation and parametric amplification in nonlinear optical materials have produced great interest and much intensive research. The reason for this interest and research resides in the broadband characteristics of parametric devices relative to the narrow band characteristics of most laser devices.

While lasers have opened the optical portion of the spectrum to techniques of information transmission via coherent radiation and have provided power levels that are apparently adequate for the proposed uses, it is desirable to associate the lasers with modulating and amplifying apparatus of greater bandwidth in order to utilize fully the potentially great rates of information transmission available at such high frequencies.

Two main types of nonlinear optical devices have emerged. The first type involves noncentrosymmetric crystals, in which optical electric field intensities induce polarization waves having a substantial component that is proportional to the square of an electric field intensity or to the product of intensities of two different-frequency optical electric fields. Development of this type of device has progressed until a variety of usable techniques are now available. For example, traveling wave parametric amplification can be provided as disclosed in U.S. Pat. No. 3,234,475 of J. A. Giordmaine et al. issued Feb. 8, 1966, and assigned to applicants' assignee.

The other type of nonlinear optical device, the type with which this invention is concerned, involves radiation active media in which many lines of frequency-shifted radiation can be obtained in response to incident radiations. In particular, Raman active media, i.e., those capable of producing Raman radiation, have been widely investigated. Raman radiation is a radiation produced in response to incident radiation by a change in the rotational, vibrational or other energy levels of scattering molecules. Radiations having frequencies lower than the frequency of incident radiation are called Stokes lines and those having higher frequencies are called anti-Stokes lines. Typically, the Stokes (or anti-Stokes) lines are frequency shifted from the pump frequency by an amount usually in the range of 50 to 5,000 wavenumbers.

In general, in the prior art, the incident or pump radiation has been in the nature of an optical pulse of duration of about ten nanoseconds. Such a pulse has a free space length of 300 centimeters. With the advent, however, of mode-locking techniques, it is now possible to generate extremely intense pump pulses of the duration of several picoseconds or less. A one picosecond ($10^{-12}$ sec.) pulse has a free space length of only 0.03 centimeters. The significance of this difference in pump pulse length by a factor of $10^{-4}$ is best understood in the context of the problem of group velocity matching, i.e., matching the group velocity of the Raman radiation to the group velocity of the pump radiation.

Generally, the Raman active medium utilized in the prior art has a dimension in the order of a few centimeters. Thus, a ten nanosecond pump pulse is typically 10 to 100 times longer than the medium itself. There is, therefore, no problem of group velocity matching inasmuch as the pump pulse is always present in all parts of the medium simultaneously with the creation of stimulated Raman radiation. The Raman radiation and the pump radiation always overlap even though the group velocities may differ, and always provide efficient conversion of pump radiation without concern for group velocity matching.

The advent of the picosecond pulse has drastically changed the situation. The picosecond pulse is extremely intense (e.g., 20 GW/cm$^2$) and consequently is a highly desirable source of pump radiation. In collinear interaction between picosecond pump pulses and the first Stokes wave in a Raman active medium, stimulated Raman action should convert 100 percent of the pump radiation into Stokes radiation. In practice, however, it has been discovered that one observes less than 0.3 percent conversion. This reduced efficiency is the result, in part, of the fact that the picosecond pump pulse travels at a substantially slower velocity than the stimulated Raman pulse (i.e., the two pulses being at different optical frequencies travel at different velocities due to the dispersive effect of the medium). The two pulses, both of picosecond duration and therefore of the length of the order of 0.03 cm. separate in the medium. Once the pulses no longer overlap, the efficiency of conversion is drastically reduced. This problem is further complicated by the fact that the shorter the pulse duration, the shorter is length over which the pulse experiences exponential gain.

SUMMARY OF THE INVENTION

The invention comprises in an illustrative embodiment an elongated Raman active medium and total internal reflection means provided along the longitudinal dimension thereof capable of sustaining multiple reflections of Raman radiation in response to pump radiation. Optical pumping is by pulses of picosecond duration or less made incident upon one end of the medium and directed along the longitudinal axis thereof. The Raman pulse radiation inherently traverses the most favorable path for exponential gain. That path, which is the same path for group velocity matching, is a zigzag path at an angle $\theta = \cos^{-1}(v_{gp}/v_{gs})$, where $v_{gs}$ and $v_{gp}$ are, respectively, the Raman and pump pulse group velocities. Raman emission occurs at the other end of the medium in a cone of angle $\theta' = 2 \sin^{-1}(n \sin \theta)$, where $n$ is index of refraction of the Raman medium.

It is to be noted first that this invention relates to group velocity matching, which involves multifrequency signals, and not phase matching, which involves single-frequency signals. Furthermore, phase matching is generally not a problem in Raman emission devices because the optical phonon propagation vector which accompanies the Stokes emission inherently adjusts itself as to close the vector diagram formed by pump and Stokes propagation vectors. Secondly, the zigzag path which Raman radiation traverses occurs inherently as contrasted with prior art optical, semiconductor modulators and the like in which a light beam to be modulated is intentionally direct into a semiconductor having a pair of parallel reflecting surfaces in order to create zigzag multiple reflections.

BRIEF DESCRIPTION OF THE DRAWING

The invention, together with its various features and advantages, can be easily understood from the following more detailed description taken in conjunction with the accompanying drawing in which the sole FIG. is a schematic of an illustrative embodiment of a Raman device in accordance with the principles of this invention.

DETAILED DESCRIPTION

Turning now to the FIG., there is shown in an illustrative embodiment of the invention a Raman emission device comprising an elongated cylindrical Raman active medium 10 having means 12 for providing total internal reflection (TIR) of stimulated Raman radiation. Where the medium 10 is a crystal such as KDP, the TIR means 12 would include, for example, a silver layer on the surface of the crystal or merely a highly polished crystal surface in which case the means 12 would comprise the air-crystal interface. On the other hand, where the medium 12 is a liquid such as nitrobenzene, the TIR means 12 would include, for example, a silver layer on the interior (preferred) or exterior cylindrical surface of the container carrying the liquid medium. Alternatively, if the liquid has a high index of refraction and the container a relatively low one, then TIR would occur inherently at the container-liquid interface i.e., the means 12 would comprise the container-liquid interface.

An optical pump source 14 generates intense picosecond pump pulses, designated 16, by means well known in the art, as for example by Q-switching or mode locking a laser. The picosecond pump pulses are directed into one end 18 of the Raman active medium 10 and along the longitudinal axis thereof to stimulate therein Raman radiation which is also in the nature of picosecond pulses.

Without the TIR means the Raman and pump pulses would separate because the group velocity of the Raman pulses is greater than that of the pump pulses. Consequently, the efficiency of conversion of pump radiation to Raman radiation would be greatly reduced. With the TIR means, however, the Raman pulses inherently choose a path within the medium which maximizes the exponential gain experienced. To a good approximation the length $L_g$ over which a pulse of duration $\Delta t$ experiences exponential gain is given by $$L_g \approx \frac{v_g^2 \Delta t}{2 \Delta v_g} \quad (1)$$

where $V_g$ is the group velocity of the Raman pulse and $\Delta v_g$ is the difference in group velocities of the Raman and pump pulses due to the dispersion of the active medium 10. For a one picosecond pulse $L_g$ (nitrobenzene)=7.6 mm. and $L_g$ ($CS_2$)= 12.2 mm. With such small values of $L_g$, it is highly desirable that the Raman and pump pulses remain in step, i.e., that they are group velocity matched. Such matching occurs inherently since the path the Raman pulses traverse to maximize gain is the same path which provides group velocity, i.e., a zigzag path 20 in which the Raman pulses reflect back and forth from the TIR means 12, as mentioned previously, at an angle $\theta$ given by $$\theta = \cos^{-1}\left(\frac{v_{gp}}{v_{gs}}\right) \quad (2)$$

where $v_{gs}$ and $v_{gp}$ are, respectively, the group velocities of the Raman (Stokes) pulses and the pump pulses. Group velocity matching occurs because the zigzag path length of the faster Raman pulses is longer than the straight path length of the pump pulses by just the amount necessary to keep the pulses synchronized.

Although only one zigzag path is shown in the FIG., it should be clear that there are an infinite number of such paths which the Raman pulses traverse at the angle $\theta$, resulting in intense Raman emission at the other end 22 in a cone 24 of angle $\theta'$ given by $$\theta' = 2 \sin^{-1}(n \sin \theta) \quad (3)$$

where $\theta$ is defined in equation (2) and $n$ is the index of refraction of the medium. Where the medium is a liquid carried by a container, then $n$ is assumed to be the same for both the liquid and container.

A corollary advantage of the invention is the fact that backward stimulated Brillouin emission (scattering) is greatly reduced for picosecond pulses because the gain-length product is small, i.e., the interaction time between the picosecond pump pulses and stimulated Brillouin radiation traveling in the opposite direction is extremely short resulting advantageously in inefficient Brillouin emission. Typically, the backward Brillouin scattering is less than about $3 \times 10^{14}$ of the pump intensity for picosecond pulses as compared to about $9 \times 10^{11}$ for longer pulses and lower intensities.

In an illustrative example, the pump source 14 includes an $Nd^{+3}$ glass laser mode locked with Eastman 9860 dye. To generate a train of pulse of duration of 1—2 picoseconds and of spacing 4 nanoseconds, the $1.06\mu$, 1GW output of the laser is converted to 5,300 A., 150 MW by a $KH_2PO_4$ harmonic generator crystal. The 5,300 A. pump radiation is focused by a 30 cm. focal length lens onto a 10 cm. sample cell of a Raman active liquid placed 25 cm. from the lens. Typically, the peak laser intensity in the liquid is 10—20 $GW/cm.^2$. The Raman active medium can be one of many liquids. To mention a few: carbon disulfide, benzene, toluene, chlorobenzene, bromobenzene, or nitrobenzene. When pumped with 5,300 A. radiation, nitrobenzene, benzene and carbon disulfide generate Raman radiation at 5,706 A., 5,593 A. and 5,491 A., respectively.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

We claim:

1. A Raman emission device for matching the group velocity of Raman radiation to the group velocity of pump pulses comprising an elongated Raman emission medium:

means for providing total internal multiple reflections of the Raman radiation along the elongated dimension of said medium in response to optical pump pulses;

means for generating optical pump pulses of the order of several picoseconds duration or less; and means for directing the pulses into said Raman medium along the elongated dimension thereof.

2. The device of claim 1 wherein said medium comprises a Raman active elongated crystal and said total internal reflection means comprises a total internal reflection layer deposited on the elongated surfaces of said crystal.

3. The device of claim 1 wherein said total internal reflection means comprises the interface between said crystal and the exterior atmosphere, said crystal having highly polished exterior elongated surfaces.

4. The device of claim 1 wherein said medium comprises a Raman active liquid in combination with elongated container means for carrying said liquid, said elongated container means having transparent ends for admitting pump radiation and for permitting egress of Raman radiation, and wherein said total internal reflection means comprises a total internal reflection layer deposited on the interior elongated surfaces of said container means.

5. The device of claim 1 wherein said medium comprises a Raman active liquid in combination with elongated container means for carrying said liquid, said elongated container means having transparent ends for admitting pump radiation and for permitting egress of Raman radiation, and wherein said total external reflection means comprises a total external reflection layer deposited on the interior elongated surfaces of said container means.

6. The device of claim 1 wherein said medium comprises a Raman active liquid in combination with elongated container means for carrying said liquid, said elongated container means having transparent ends for admitting pump radiation and for permitting egress of Raman radiation, and wherein said total internal reflection means comprises the interface between said container and said liquid, the former having a low index of refraction and the latter having a comparatively high index of refraction.

UNITED STATES PATENT OFFICE
CERTIFICATE OF CORRECTION

Patent No. 3,571,607     Dated March 23, 1971

Inventor(s) Joseph A. Giordmaine and Stanley L. Shapiro

It is certified that error appears in the above-identified paten and that said Letters Patent are hereby corrected as shown below:

Item [72] of cover sheet, change "Summitt, N.Y." to --Summit, N.J.--.

Column 1, line 53, change "$10^{112}$" to --$10^{-12}$--.

Column 2, line 29, change "$\cos^{11}$" to --$\cos^{-1}$--.

Column 2, line 32, change "$\sin^{11}$" to --$\sin^{-1}$--.

Column 2, line 45, change "direct" to --directed--.

Column 2, line 53, change "FIG." to -- figure--.

Column 2, line 59, change "FIG." to --figure--.

Column 3, line 20, change "$V_g$" to --$v_g$--, change "$\Delta vg$" to --$\Delta v_g$--.

Column 3, line 46, change "$\sin^{11}$" to --$\sin^{-1}$--.

Column 3, line 58, change "$3 \times 10^{14}$" to --$3 \times 10^{-4}$--.

Column 3, line 60, change "$x\ 10^{11}$" to --$x\ 10^{-1}$--.

Column 4, line 22, delete the colon, and substitute therefor a comma.

Signed and sealed this 9th day of November 197

(SEAL)
Attest:

EDWARD M. FLETCHER, JR.
Attesting Officer

ROBERT GOTTSCHALK
Acting Commissioner of Patents